United States Patent [19]

Novich et al.

[11] Patent Number: 4,904,411
[45] Date of Patent: Feb. 27, 1990

[54] HIGHLY LOADED, POURABLE SUSPENSIONS OF PARTICULATE MATERIALS

[75] Inventors: Bruce E. Novich, Lexington; Mark A. Occhionero, Arlington; Richard L. Pober, Waban, all of Mass.

[73] Assignee: Ceramics Process Systems Corp., Milford, Mass.

[21] Appl. No.: 242,726

[22] Filed: Sep. 9, 1988

Related U.S. Application Data

[63] Continuation-in-part of Ser. No. 856,803, Apr. 25, 1986, Pat. No. 4,816,182, and a continuation-in-part of Ser. No. 45,684, May 1, 1987, abandoned.

[51] Int. Cl.$^4$ .................. B01J 13/02; C04B 35/02; C04B 35/10; C04B 33/32
[52] U.S. Cl. .................. 252/309; 252/313.1; 252/313.2; 252/314; 264/212; 501/1; 501/94; 501/97; 501/98; 501/103; 501/126; 501/127; 501/133; 501/137; 501/96; 501/138; 501/139; 501/152; 501/153; 501/154; 501/154
[58] Field of Search .................. 252/309, 310, 313.1, 252/313.2, 314; 106/38.2, 287.17, 287.19; 264/86, 212; 501/1, 94

[56] References Cited

U.S. PATENT DOCUMENTS

| | | | |
|---|---|---|---|
| 3,956,145 | 5/1976 | Christopher, Jr. et al. | 252/8.55 D |
| 4,221,697 | 9/1980 | Osborn et al. | 260/42.53 |
| 4,301,020 | 11/1981 | Johnson, Jr. et al. | 252/62.62 |
| 4,569,920 | 1/1986 | Smith-Johannsen | 501/1 |
| 4,728,578 | 3/1988 | Higgins et al. | 428/462 |

Primary Examiner—Brooks H. Hunt
Assistant Examiner—Virginia B. Caress
Attorney, Agent, or Firm—Bradley N. Ruben

[57] ABSTRACT

Slurries or suspensions for forming sintered ceramic or metallic articles are described as having a high volume fraction of sinterable particles, at least 55% by volume, while the slurries maintain a pourable viscosity, such as not more that 2000 cPs at 100 s$^{-1}$; the slurries can be dilatant and/or pseudoplastic. The slurries are prepared by using specific families of dispersants; namely acrylic acid-based polymeric polyelectrolytes, polyethylene imine-based polyelectrolytes, and coupling agents from the subfamilies of oxy-silane esters and phosphate esters. Fabrication of the compositions includes milling under high energy and the addition of at least a portion of the particles in a step-wise manner.

13 Claims, 1 Drawing Sheet

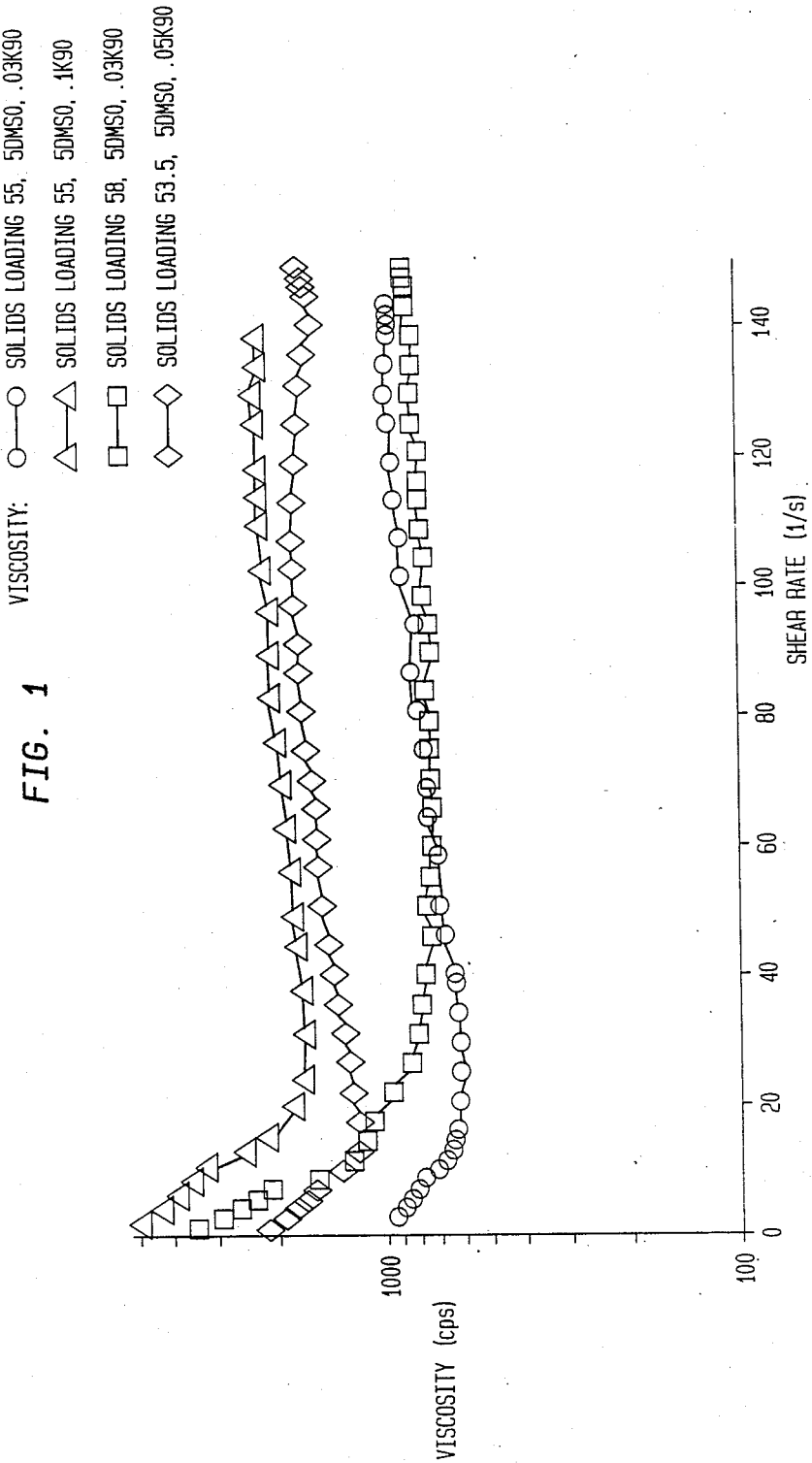

HIGHLY LOADED, POURABLE SUSPENSIONS OF PARTICULATE MATERIALS

This application is a continuation-in-part of U.S. patent applications Ser. Nos. 06/856,803, filed 25 Apr. 1986, now U.S. Ser. No. 4,816,182, and 07/045,684, filed 01 May 1987, now abandoned both incorporated herein by reference, as is the disclosure of application Ser. No. 07/034,099, filed 01 Apr. 1987, now abandoned.

BACKGROUND OF THE INVENTION

1. Field of the Invention

This invention relates to the processing of sinterable colloidal materials, such as ceramics and metals, in suspension. More particularly, this invention relates to providing highly volume loaded ($\geq 55$ v/o) suspensions of such materials which nevertheless are readily flowable, such as by pouring or by low pressure injecting.

2. The state of the art

Advances in ceramic processing have permitted the replacement of various components of electrical and mechanical equipment with sintered ceramic parts. Ceramics have found widespread use in electronics as a substrate for integrated circuit packages. Ceramic substrates are typically formed by sintering slips produced from suspensions of ceramic particles. however, ceramics have exhibited problems of cracking, large and inconsistent shrinkage upon drying and firing, and non-uniform formability leading to poor microstructures.

It is well-known that processing defects can greatly affect the performance of a ceramic article. See, e.g., Bowen et al., "Basic Needs in High Temperature Ceramics," *J. Mat. Sci. Eng.*, vol. 44, p. 156ff (1980); Rhodes, "Agglomeration of Particle Size Affects Sintering of $Y_2O_3$-Stabilized $ZrO_2$," *J. Amer. Cer. Soc.*, vol. 64, pp. 19–22 (1981); Lange et al., "Processing Related Fracture Origins: I, II, III," *J. Amer. Cer. Soc.*, vol. 65, pp. 396–408 (1983); and Aksai et al., "Uniformity of Alumina-Zirconia Composites by Colloidal Filtration," *J. Amer. Cer. Soc.*, vol. 66, no. 10, pp. C190 and C193; and see generally *Ceramics Processing Before Firing*, Ed. by Onoda, Jr., and Hench (New York: John Wiley & Sons, 1978). These processing defects are typically property limiting; however, the above investigators have demonstrated that by wet processing of colloidal ceramic particles, processing flaws can be virtually eliminated. This is typically achieved by controlling the packing of the particles on a particulate scale and not on a macro part-sized scale.

Rheology characteristics are a function of the volume fraction of solids; for example, viscosity, or rate of momentum transfer, or flowability, or pourability, is directly related to the "free volume" between particles. (Accordingly, to represent a volume fraction the symbol "v/o" will be used herein as a contraction of "vol. %".) Where $V_{fs}$ is the volume fraction of solids, $1-V_{fs}$ is the free volume; as Albert Einstein showed in 1925 for dilute solutions of spheres in liquid, $N_r = 1 + 2.5\ V_{fs}$, where $N_r$ is the viscosity of the slurry relative to the viscosity of the liquid without suspended particles (i.e., the relative viscosity). The relative viscosity can also be referenced to the maximum packing concentration of solids, $V_{max}$, the closest packed arrangement of particles in a dense, randomly packed array, as shown by Chong et al., *J. Appl. Polymer Sci.*, vol. 15, p. 2007 (1971). In this reference frame, $N_r = (1 + 0.75(V_{fs}/V_{max})/(1-(V_{fs}/V_{max})))^2$; accordingly, as the volume fraction of solids approaches the maximum, the viscosity becomes infinite.

With regard to the actual particles in suspension, a distinction exists between colloids and non-colloidal particles; the former being governed by surface forces and therefore acting as individual flow units, while the latter are governed by gravity or body forces (e.g., drag). There are a number of factors effecting whether a particle is colloidal, including actual size, density, and geometry. A rough estimate is that particles having an equivalent spherical diameter of $\leq 5\ \mu m$ are colloidal; however, colloidal particles can be 20 $\mu m$ or 50 $\mu m$ in size, and metal particles exhibit colloidal properties at larger sizes than do oxide ceramics because they also exhibit a higher Hamaker constant.

Nevertheless, in all cases, particle surfaces (colloidal or otherwise) are characterized by broken crystallographic bonds which were cleaved during particle synthesis. These broken bonds have a high free energy and provide reactive sites due to the desire of these surface atoms to be bonded to another species. This surface reaction zone, which extends into the dispersion medium at the interface of the particle-fluid boundary, is called the diffuse double layer (DDL). The DDL is considered to be attached to the particle surface, so that as the particle moves through a fluid, it carries the DDL with it. For colloidal particles, the volume of the double layer can be on the order of the particle diameter, such that a significant amount of volume for the flow unit can be attributed to the DDL. A quantity, $V_{eff}$, the effective volume solids, can be described as $V_{eff} = V_{fs} + V_{DDL}$, where the latter term is the volume of the adsorbed double layer. The unsatisfied surface charges of the particle are felt throughout the DDL in a distribution which is strongest at the particle surface and is typically modeled to exponentially decrease out into the bulk solution.

For colloidal dispersions, the interparticle double layer interactions affect the viscosity of the dispersion at a lower volume fraction of solids than for non-colloidal dispersions because the double layer volume increases the effective volume fraction solids and its corresponding effect on the pourability of the dispersion.

Interparticle forces can be either attractive, such as Van der Waals attractionn (which is largely a function of material type and particle-to-particle distance), or repulsive, as when particles having the same surface charge are brought closer together. The double layer volume can be reduced by neutralizing or satisfying the surface charge on the particles. For example, dispersants (surface active soluble species which adsorb onto particle surfaces) are attracted to the double layer, and by absoring to the charged surface molecules act to minimize the free energy of the interfacial region; however by doing so they decrease the double layer, which may allow attractive forces to dominate. Thus, where repulsive forces used to dominate and create a high viscosity due to a large effective volume fraction of solids, attractive forces may dominate and particle agglomeration may occur with an accompanying increase in viscosity due to attractive agglomerative interactions, and the agglomerates may attract each other further exacerbating the situation. For a practical point of view, one may have a high viscosity system, add an amount of surfactant, and still have a high viscosity system, even though (unnoticed) the system chemistry is completely different; adding an amount of surfactant effective to achieve the desired viscosity is empirical, so a lesser amount of surfactant added may have lowered the viscosity. In general, to create a high solids concentration colloidal suspension which is nevertheless fluid and pourable, it is essential to provide a suspension in which the particles are predominantly non-interacting and thus act, essentially, as individual flow units.

Dispersants play an important role in keeping the double layer small while overcoming the Van der Waals attractive forces, and the use of polymeric polyelectrolytic dispersants to achieve highly loaded colloidal suspensions for ceramics or powdered metal manufacture is not generally known in the literature. Highly loaded, non-colloidal dispersions are known in the art. For example, Klimenco and Polyakov, *Glass and Ceramics*, vol. 43.4, pp. 165–167 (1986), describe a technique for making highly concentrated silicon carbide suspensions in water at a 50% solids concentration; however, these particles were predominantly non-colloidal. Non-colloidal particles are large enough so that the $V_{DDL}$ has a negligible effect on the effective particle volume, $V_{eff}$. For example, a 20 $\mu$m diameter alumina sphere will have a particle volume of $1.33 \times 10^{-9}$ cm$^3$. Napper, *Polymeric Stabilization of Colloidal Dispersions*, p. 424 (New York; Academic Press, 1983) has shown that a typical low molecular weight polymeric polyelectrolyte (e.g., 10,000 MW) will give an adsorbed layer of approximately 5 nm. Thus, when such a dispersant is adsorbed onto a 20 $\mu$m particle, the polyelectrolyte double layer will have a negligible affect on the effective particle volume. On the other hand, colloidal particles are small enough so that the double or adsorbed layer surrounding the particle is a significant portion of the effective particle volume. For example, a spherical 0.2 $\mu$m diameter particle will occupy a volume of $4.19 \times 10^{-15}$ cm$^3$. Assuming the same adsorbed layer of 5 nm, the effective radius of the particle with an adsorbed layer is 0.105 $\mu$m, thus resulting in an effective spherical volume of $4.85 \times 10^{-15}$ cm$^3$. This represents a 15.8% increase in the effective volume of each particle, which thus translates to an equivalent increase in the effective volume fraction solids. That is, the "sphere of influence" of the double layer of an alumina colloidal particle can increase the effective volume by which the particle interacts with other particles by almost 16%, a tremendous effect on relative viscosity.

Commercial colloidal processing has experienced several difficulties in the formation of ceramic parts due to one or more of the following factors:

1. Due to the inability to overcome interfacial and wetting forces of fine particulates, which serve to keep particles as discrete suspension units, processing has typically been limited to dilute suspensions.

2. Typical dilute suspensions result in a low green density, leading to longer drying and binder burnout, increased shrinkage and stresses therefrom on firing, and inhomogeneous microstructures, all leading to non-reproducible processing and properties.

3. Dilute suspensions tend to have very slow rate-limiting processing steps. Dewatering or debinderizing the carrier between fine particles is generally very slow due to the permeability, settling, sedimentation, and diffusion limitations for compacts of these fine powders and pore sizes.

If these obstacles were overcome, highly loaded, low viscosity, pourable suspensions would be a valuable feedstock for overcoming these processing limitations.

Phelps and McLaren, "Particle-Size Distribution and Slip Properties" in *Ceramics Processing Before Firing*, op. cit., note certain rheology characteristics of both uniformly sized particles and colloidal particles. At a loading of 51 v/o for a coarse alumina slip, a shear thickening result is evident, and increasing the loading of a fine alumina powder from 50 v/o to 57 v/o results in a dramatic decrease in flow for a given force. The effect of colloidal particles has been discussed above, and Phelps and McLaren conclude that the more extended a distribution of particles (i.e., the less uniformly sized), the more fluid the slip is at high volume solids loadings. As they show, even "non-colloidal" but uniformly sized particles are not flowable at loadings greater than about 51 v/o. Generally, the fine particulate ceramics industry considers 40–45 v/o solids to be "concentrated" or highly loaded. See, e.g., Sommer, "Viscosity of Concentrated Newtonian Suspensions," Ibid. at pp. 227–233.

With such a background, even the present state of the art must empirically determine suitable dispersants by an empirical method, typically by first deciding on a solvent system (e.g., aqueous, non-aqueous) and then empirically choosing a series of conventional dispersing agents to test in the suspension system. For example, Mikeska and Cannon, "Dispersants for Tape Casting Pure Barium Titanate," *Advances in Ceramics: Forming of Ceramics, Volume 9*, ACS Publishing, p. 164–183 (1984), screen over 70 commercially available dispersants before deciding on a satisfactory system for their particular materials. Similarly, Nilsen and Danforth, "Dispersion of Laser-synthesized Silicon Nitride Powder in Nonaqueous Systems," *Advances in Ceramics: Ceramic Powder Processing, Volume 21*, ACS Publishing, pp. 537–547 (1987), screened over 25 dispersants before arriving at a satisfactory system.

Dispersants are generally postulated to function by at least one of two mechanisms. Steric dispersants are understood to operate by presenting (i) functional groups exhibiting strong surface interaction with the particle surface while being only marginally soluble in the solvent and (ii) stabilizing moieties that are highly soluble in the solvent. Electrostatic dispersant include acids and bases which operate to modify the pH of the suspending medium. Typically, dispersing agents have been used in aqueous and other solutions to create pourable suspensions of submicron particles having a maximum solids fraction of approximately 50 v/o. Although this maximum solids fraction can be higher if the particles do not have a narrow size range, uniform size particles may be desirable to make for uniform ceramics having uniform properties, such as reproducible shrinkage for net or near net shape forming, and for high performance applications.

SUMMARY OF THE INVENTION

Accordingly, it would be beneficial to provide a low viscosity, pourable suspension having a high volume fraction of solids. Additionally, such a system should provide each solid particle as an individual flow unit without agglomerative effects despite the close interparticle distances, thereby resulting in a high solids loading but also a low, pourable viscosity.

In this respect, we have discovered various classes of dispersants which interact with colloidal and/or narrow size range particles in such a way as to allow the creation of highly loaded, low viscosity slurries. The invention is applicable to both aqueous and non-aqueous media, including hydrocarbons (e.g., toluene, cyclohexane) and polar organics (e.g., alcohols). The invention is also applicable to a wide variety of particulate materials, especially those for sintering, such as ceramics, metals, and mixtures thereof. The inventive compositions are suitable as the starting materials for all wet powder processing techniques applicable to forming sintered ceramics, sintered powdered metals, and the like.

In summary, our invention includes a slurry composition comprising (i) colloidal and/or submicron particles selected from the group consisting of ceramics and metals and combinations thereof, (ii) a solvent system, and (iii) a dispersant selected from the group consisting of acrylic acid-based polymeric polyelectrolytes, polyethylene imine-based polyelectrolytes, phosphate esters, and oxy-silane esters present in an amount effective to achieve a solids loading of at least 55 v/o and to provide a slurry viscosity of less than 10,000 cPs at 100 sec.$^{-1}$, more preferably less than about 2,000 cPs, and most preferably less than 1,000 cPs.

The invention also provides a process for forming a slurry having a pourable viscosity, comprising (i) admixing a solvent system, a dispersant selected from the group consisting of acrylic acid-based polymeric polyelectrolytes, polyethylene imine-based polyelectrolytes, phosphate esters, and oxy-silane esters and at least 55 v/o submicron and/or narrow size range particulate materials selected from ceramics, metals, and mixtures thereof in a staged order of addition, and (ii) agitating the mixture under a high shear rate to achieve a slurry having a viscosity of less than 10,000 cPs at 100 sec.$^{-1}$, preferably less than 5,000, more preferably less than 2,000 cPs, and most preferably less than 1,000 cPs.

Still further, the invention provides a process for forming a solid article, comprising (a) providing a low viscosity slurry by (i) admixing a solvent system, a dispersant selected from the group consisting of acrylic acid-based polymeric polyelectrolytes, polyethylene imine-based polyelectrolytes, phosphate esters, and oxy-silane esters and at least 55 v/o submicron and/or narrow size range particulate materials selected from ceramics, metals, and mixtures thereof in a staged order of addition, and (ii) agitating the mixture under high energy to achieve a slurry having a viscosity of less than 10,000 cPs at 100 sec.$^{-1}$, preferably less than 5,000, more preferably less than 2,000 cPs, and most preferably less than 1,000 cPs, (b) deairing the slurry, (c) shaping the slurry under low pressure in a mold, and (d) solidifying the shaped slurry by removing the solvent system.

A feature of the invention is that green bodies formed from these slurries generally do not require the addition of an organic binder for green strength; accordingly, problems and extra processing steps required for binder burnout are avoided. Additionally, superior green strength is achieved in part due to the closer packing of the particles; when the solvent system is removed, there is less of a change in the microstructure, and less rearrangement of the particles results in improved microstructural and macrostructural properties in both the green and the fired article.

DESCRIPTION OF SPECIFIC EMBODIMENTS

The present invention is directed to forming highly loaded slurries of submicron and/or narrow size range particles used for forming complex shaped sintered articles; such particles include ceramics, metals, and mixtures thereof. Exemplary ceramic compositions include alumina, aluminum nitride, silicon nitride, silicon carbide, silica, zirconia (stabilized, partially stabilized, and unstabilized), dissociated zircon, yttria, titania, barium titanate, diborides, beryllia, and the like, and mixtures thereof. Exemplary metal compositions include copper, steel (e.g., stainless or any of a plethora of alloys), aluminum, copper, gold, silver, nickel, and the like, and mixtures thereof.

The particles are provided in the form of a powder; many are commercially available, and a preferred method of obtaining the desired size range powder is by centrifugal classification as described in co-pending U.S. patent application Ser. No. 07/028,891, filed 23 Mar. 1987, incorporated herein by reference. One problem with obtaining submicron and/or narrow size range particles by centrifugal classification is that the cake residing in the centrifuge bowl is often at best dilatent, and at worst essentially immovable (in which case the particles are recovered by chiseling pieces from the cake). To overcome this problem, the method taught in co-pending U.S. patent application Ser. No. 07/036,325, filed 09 Apr. 1987, incorporated herein by reference, is preferred.

As described above, this invention is particularly directed to submicron and/or narrow size range particles; nevertheless, this invention is applicable to all colloidal particles regardless of the actual size or distribution. As used herein, "submicron" refers to a powder having an average particle size of $\leq 1$ μm, and "narrow size range" refers to a powder having a standard deviation of the particle sizes not greater than 100% of the mean particle size, preferably not greater than 50% of the mean particle size. It should be noted that the terms submicron and narrow size range are not meant to be mutually exclusive.

The solvent system can be one or a mixture of solvents; the solvent(s) should be essentially inert with respect to the particulates and with respect to the dispersant. Exemplary solvent systems include water, alcohol (preferably short chain alcohols such as methanol, ethanol, isopropanol, n-butanol, and so forth), non-polar organics (e.g., hydrocarbons such as cyclohexane and benzene), and polar organics (e.g., in addition to alcohols, those such as acetone, 2-butanone (methyl ethyl ketone), dimethyl sulfoxide (DMSO), toluene (slightly polar), and so forth). By a polar solvent it is generally meant a dielectric constant of at least 30, preferably at least 80, at 20° C. Mixtures of various components from the same or different groups of these can be used, such as a combination of water, methanol, and DMSO (also exemplary of an aqueous/non-aqueous system), water plus acetone, and MEK plus toluene. Monomers and/or oligomers can also constitute all or a part of the solvent system, such as methacrylate monomers and other monomers copolymerizable therewith, such as styrenes and other vinylic monomers (e.g., vinyl acetate, vinyl pyridine, and vinyl chloride).

The dispersant will adsorb onto the particle surface and decrease the effective volume of the diffuse double layer; it will also act to prevent particle agglomeration, by steric, electrostatic, or a combination of both effects. Other parts or moieties of the dispersant molecule will be solvated by the solvent system.

We have discovered certain dispersant families that allow the production of highly loaded yet pourable slurries. One of these families is acrylic acid-based polymeric polyelectrolytes. These include, for example, those available from R. T. Vanderbilt Co., Inc., of Norwalk, CT, under the designations DARVAN C and DARVAN 821A (both described as polyelectrolytes of the ammonium salt type), those available from W. R. Grace & Co., Lexington, MA, under such designations as DAXAD 30 and DAXAD 32 (described respectively as a sodium and an ammonium salt of a carboxylated polyeletrolyte), those available from National Starch & Chem. Corp., Bridgewater, NJ, under such designations as NARLEX LD-42 and NARLEX LD-45 (described respectively as a sodium and an ammonium acrylate copolymer with propylene glycol), and those available from Witco Chem. Co., Perth Amboy, NJ, under such designations as EMCOL CC-55 (described as a cationic, polyoxypropylene methyl ethyl ammonium acetate). These dispersants are particularly preferred for polar media (e.g., water, acetone, alcohol), which may generally be defined as having a dielectric constant of at least 30, although they may be used in other media. These dispersants are also preferred for particles with basic surfaces, such as alumina.

Another family of dispersants are coupling agents, defined primarily as materials that improve the adhesive bond of dissimilar surfaces. Of the various coupling agents available, the organo-functional oxy-coupling silane esters and the phosphate esters are two subfamilies which we have discovered can be used to prepare highly loaded pourable slurries. Exemplary of the first subfamily is gamma-aminopropyl-triethoxysilane and its derivatives, as well as that available from Union Carbide Corp., Specialty Chem. Div., Danbury, CT, under the designation A174 (described as gamma-methacryloxypropyltrimethoxysilane). Exemplary of the second subfamily is available from GAF Corp., Wayne, NJ, under the designation GAFAC RE-610 (described as an anionic polyoxyethylene nonylphenyl ether phosphate, also described as a phosphate ester). We have found dispersants such as the phosphate esters to be particularly well-suited for slightly polar and/or organic solvents, such as 2-butanone, toluene, and mixtures thereof.

The foregoing dispersants can be used in virtually any compatible medium, although some experimentation may be necessary to determine which is easier to use for a given particulate/solvent system.

Another family of dispersants we have discovered that are useful in our invention are also polyelectrolytes, specifically polyethylene imines. Exemplary of these include CORCAT P-12, and P-600, available from Virginia Chemicals, Portsmouth, VA, a polyethylene imine $(C_2H_5N)_X$ where $900 \leq X \leq 1400$ and having molecular weights of $\geq 1200$ and $\geq 60,000$, respectively. We have discovered that this family of dispersants is particularly well suited for dispersing particles with acidic surfaces (e.g., silica), in contrast to the polyacrylic polyelectrolytes which are more preferred for dispersing particles with basic surfaces. These dispersants are preferred for polar and slightly polar media, such as water, MEK/toluene mixtures, and alcohols.

The last dispersant is particular to short-chain alcoholic systems; specifically, we have found that triethanolamine (TEOA) is particularly suitable for slurries based on ethanol. While not desirous of being constrained to a particular theory, it is believed that the three ethanol moieties on the TEOA are readily solvated by the ethanol solvent, although it is not understood why the basic tertiary nitrogen appears to readily adsorb onto a basic surface such as that of alumina. Nevertheless, we would expect for a particulate such as alumina, TEOA would work well with methanol, ethanol, and/or propanol as the solvent, as would diethanolamine; and likewise we would expect a di- or tertiary amine having moieties selected from among ethanoxy, propanoxy, and butanoxy (including isopropanoxy) to function well in propanol as the solvent. In general, we would expect that for an alkanol solvent having n carbon atoms up to about n=6, a suitable dispersant would be selected from a di- or tertiary amine having alkanoxy moieties, each alkanoxy moiety having $n-1$ to $n+1$ carbon atoms, or mixtures thereof.

While it is preferably to use distilled or deionized water for producing these slurries, ordinary tap water is suitable. In large part this is because the commercial powders themselves are not of such a high purity that "pure" water is required. Moreover, we have discovered that a significant advantage to using the above dispersant families, especially the polymeric polyelectrolytes, is that they generally buffer any effects of dissolved solutes on the rheological properties.

As used herein, terms such as "low viscosity" and "pourable" generally describe the property of the slurry as being able to flow in a constant stream under gravity head; i.e., the slurry can be poured in a constant stream and it will not plop or exhibit discontinuous flow. The slurries have the consistency of from milk (about 500 cPs) to heavy cream (about 2500 cPs) to heavy machine oil (about 7000 cPs). This rheology can be contrasted with that of a paste, such as butter at room temperature, which is readily deformable but will not flow (at least not in a constant stream). It is also unexpected that these slurries can be produced with a minimal about of agitation, generally anywhere from a few minutes up to 24 hours. This is in stark contrast to disclosures such as that of Borase et al., U.S. Pat. No. 4,587,068, who describes forming a slurry having about 56.4 v/o alumina which, after milling for 168 hours (7 days), exhibits a viscosity of 3500 cPs. As described more fully below, applicants have formed a slurry of about 58.1 v/o in a similar solvent system which, after milling for 18 hours, exhibits a viscosity of about 200 cPs.

It is also important to note that the slurries may be dilatant, that is, they will flow only under low shear but resist flow under high shear. Nevertheless, even very dilatant suspensions can be produced by the present invention and can be poured (because pouring does not subject the suspension to a localized high shear as might high pressure injection molding (e.g., 400 psi)). It is also preferable if the suspensions are pseudoplastic (shear thinning), which enhances the storage stability of the slurries; when the slurry is sitting on the shelf there is no shear, and thus particles would settle out except for the high viscosity, but as shear is applied, even in small amounts (e.g., 10 s$^{-1}$) such as by pouring, the slurry begins to flow.

The materials are processed into the form of a pourable slurry preferably by first obtaining the desired average particle size and distribution; as described above, centrifugation is the preferred method. After a solvent medium including one or more solvents is decided upon, and after deciding upon the desired dispersant or combination thereof (although a single dispersant is preferred), all of the components are mixed in a high energy device. An exemplary high energy mixer is a high amplitude vibratory mill, such as those available from Sweco Co., Inc., Florence, KY. The mixing environment preferably includes milling media; the composition of the milling media should be chosen to minimize the effects of any contamination of the slurry from the media.

Thereafter, the solvent and dispersant are introduced into the mixing environment, and the particulate material is added; addition of the particulates is preferably in a staged order (i.e., in discrete aliquots) during the mixing period. Although all of the materials can be mixed at one time, we have found that milling times can be significantly reduced and dispersion homogeneity can be significantly increased (or at least more readily achieved) if the particulates are introduced in a staged order of addition. Mixing proceeds for a period of from about one to about 48 hours; 20-24 hours is generally a sufficient period for mixing.

This invention is applicable to essentially any colloidal particle, and even mixtures of diverse particles, as exemplified below; for example, particles having very different isoelectric points (IEP) which would be expected to agglomerate (i.e., the zero charge point, the pH at which the charge on the particle surface is zero; for example, alumina and magnesia have respective IEPs of 6-10 and 12-13 (alkaline) while zirconia and silica have IEPs of 4-6 and 1-3 (acidic)).

The invention is further illustrated by the following examples, which are not meant to limit but rather to illuminate specific embodiments of the invention.

EXAMPLE 1

Alumina particles of a narrow size range, having a mean particle size of about 0.5 μm in a distribution having sizes ranging generally from 0.3 to 0.8 μm were provided by centrifugal classification. About 478 g. of the alumina powder, about 62.8 g. of isopropyl alcohol, and ½ wt.% of TEOA (dry powder basis); the amount of alumina corresponded to about 60% by volume of the total mixture.

The components were mixed together in a high amplitude vibratory mill for about one hour. The resultant slurry had a pourable viscosity. The resultant slurry was used as a casting slip, and upon evaporation of the solvent at room temperature, set up as a green article in above five minutes; drying at about 40° C. required about one minute. Drying provided a green article having very low shrinkage upon drying, about 1%.

EXAMPLE 2

Alumina particles as used in Example 1 were mixed with water and a polyacrylate polyelectrolyte (NARLEX LD-45) using the procedure of that example; the dispersant was present in an amount of about 1.5 wt.% (dry powder basis). The approximate about of the components were 478 g. alumina, 72.8 g. water, and 7.2 g. dispersant; the alumina powder content was equivalent to about 60% by volume. The viscosity of the resulting slurry was about 200 cPs at 300 sec.$^{-1}$.

When used as a casting slip, the slurry-set up in about one hour at room temperature and in about five minutes at 40° C.; shrinkage upon drying was about 1%.

EXAMPLE 3

Following the general procedure of the above examples, the approximate amounts of the following were mixed:

| solvent | |
|---|---|
| metanol | 20 ml |
| dimethyl sulfoxide | 13 ml |
| ethylene glycol | 7 ml |
| water | 206 ml |
| subtotal = | 246 ml |
| dispersant | |
| NALEX LD-45 | 23 ml |
| sub total = | 269 ml |
| powder | |
| AKP-20 alumina | 357 ml (1421 g) |
| Total = | 626 ml |

AKP-20 alumina powder is available from Sumitomo Chemical Co., Ltd., Osaka, Japan, and has a particle size of 0.4 to 0.6 μm and a B.E.T. specific surface area of about 4 to 6 m$^2$/g.

The resulting slurry had a solids fraction of 57% by volume and exhibited a viscosity of approximately 455 cPs at 99.8 s$^{-1}$.

EXAMPLE 4

Approximate amounts of the following components were mixed:
- 858 g. steel powder (304 L brand available from Avesta Nyby Powder AB, Torshalla, Sweden)
- 82.54 g. water
- 8.58 g. dispersant (DARVAN 821A)

These components were mixed in a high amplitude vibratory mill (CRYO brand mixer, available from Miller Paint Co., Toledo, OH) for about one hour; the solids fraction was about 55% by volume of the powder. The resultant slurry exhibited a pourable viscosity of about 594 cPs at 99.92 s$^{-1}$.

EXAMPLE 5

Following the same general procedure, an aqueous suspension of dissociated zircon powder was made (using DZ-910 brand, available from Z-TEK, Bow, NH, which has a mean particle size of 1.58 μm):
- 435 g. powder, corresponding to about 58% by volume
- 79.6 g. water
- 4.4 g. dispersant (NARLEX LD-45)

The resultant slurry exhibited a liquid, flowable viscosity of about 745 cPs at 100 s$^{-1}$.

EXAMPLE 6

An aqueous suspension of fine silica, of the type typically used for investment casting cores (see, e.g., U.S. Pat. Nos. 4,093,017 and 4,583,581) was made using:
- 297 g. silica powder ($d_{avg}$=25.01 μm; SSA=1.13 m$^2$/g)
- 87 g. water
- 3 g. dispersant (CORCAT P-600)

The solids content was 55% by volume, and the resulting slurry exhibit a low viscosity of about 200 cPs at 100 s$^{-1}$.

EXAMPLE 7

A slurry was prepared having about 58 vol.% solids using the following: 6925.00 g. A16SG (alumina powder available from Aluminum Co. of America, Alcoa Center, PA); 69.25 g. NARLEX LD-45; 11.30 g. NALCO 2309 ANTIFOAM (available from Nalco Chem Co., Spec. Chem., Oak Brook, IL, identified as a hydrophobic silica and a polyglycol in a hydrocarbon solvent); 209.75 g. DMSO; 49.84 g. methanol; and 937.70 g. water.

These components were processed as above to provide a pourable slurry for which viscosity measurements were: 1070 cPs at 1 s$^{-1}$; 370–400 cPs at 10 s$^{-1}$; and 200 cPs at 100 s$^{-1}$.

EXAMPLES 8–11

A number of slurries were made with a 90:10 mixture by weight of dissociated zircon (available as DZ-910 from Z-Tek, Bow, NH) and zirconia. This mixture was formulated with 2 wt.% NARLEX LD-45, 5 wt.% DMSO (dimethyl sulfoxide), and PVP K-90 Solution (an aqueous solution of 20 wt.% polyvinylpyrrolidone, PVP, available from GAF Corp., Wayne, NJ), and water to provide the following formulations:

| Example | 8 | 9 | 10 | 11 |
|---|---|---|---|---|
| vol. % solids | 55 | 55 | 58 | 53.5 |
| wt. % PVP | 0.03 | 0.1 | 0.03 | 0.05 |

The slurries were prepared by first mixing the water, DMSO, and NARLEX; thereafter the dissociated zircon was added and milling was continued; then the zirconia was added and milling was continued; and finally the PVP was added and milling was continued until the slurry reaches the desired viscosity. The viscosity of these slurries at various shear rates is shown in FIG. 1.

EXAMPLE 12

This example illustrates the preparation of a slip having particles which would tend to agglomerate due to opposite surface charges: zirconia (isoelectric point of 4–6) and alumina (isoelectric point of 6–10).

A one-liter Nalgene bottle was prepared with 508 g. of ¼" new zirconia milling media. To the bottle were added 10.5 ml DMSO (11.6 g.), 10.5 ml methanol (8.3 g.), 9.83 ml (11.8 g.) NARLEX LD-45 (1 wt.%), and 173.3 ml water. These components were milled until thoroughly mixed. Then 1086.5 g. alumina (A16-SG; 273 ml) was added in aliquots of about 100 g. each until all was added; the mixture was agitated for about 2 minutes between additions for the first 500 g. (approximately) and for about 4 minutes for the rest of the alumina addition. Thereafter, 17 ml (95.2 g.) zirconia was added to one time and the mixture was milled for about 2 minutes. About 5.9 ml (5.9 g.) PVP K-90 Solution was added and milled.

The final slurry included a total of 500 ml, 210 ml of liquid and 290 ml of solids, about 58% by volume of solids. The slurry exhibited the following viscosity characteristics:

| shear rate (s$^{-1}$) | 1 | 10 | 50 | 100 | 150 |
|---|---|---|---|---|---|
| viscosity (cPs) | 870 | 360 | 158 | 125 | 110 |

EXAMPLE 13

A suspension was prepared containing 201 ml (807 g.) A16SG alumina, 116 ml (116 g.) water, and 7.2 ml (7.5 g.) NARLEX LD-45 as the dispersant; the alumina solids were added in aliquots with agitation on a CRYO brand mixer. The final slurry was prepared with about 15 minutes total of agitation; the final slurry had 62% by volume of solids.

Although the resulting suspension was very dilatant, and thus its viscosity could not be measured using an instrument such as a Haake viscometer, the suspension was pourable and had the consistency of white water soluble glue (e.g., Elmer's brand glue). Additionally, a test was devised to test the pourability of the slurry: a bottle containing 500 ml of the sample fluid is positioned at a 30° declination to the horizontal about 250 cm above a receiving vessel; the sample fluid must flow in a continuous stream, and the time taken for the bottle to empty is determined (hereinafter "pourability test time"). By this test, when water is the sample fluid the time is about two seconds; when the 20% PVP K-90 Solution is used by itself, the time is about 360 seconds. The slip of this example was measured accordingly, and the pourability test time was about 15 seconds.

EXAMPLE 14

Using the foregoing procedures, a slip was prepared with these approximate amounts: 252.2 g. alumina (A16SG); 4.45 g. GAFAC RE-610; and 30.53 g. cyclohexane. This resulted in a slip having 59% by volume of solids. The consistency was somewhat more pourable than the foregoing 62 v/o example; the pourability test time was not determined because of the volatility of the cyclohexane solvent.

EXAMPLE 15

A slurry was made using the general procedures of the foregoing examples with 523.23 g. SiAlON (available as Grade A powder, no sintering additives, from Vesuvius Crucible Co., Pittsburgh, PA), 15.69 g. yttria, 16.17 g. EMCOL CC-55, 10.78 g. GAFAC RE-610, 5.39 g. ELVACITE 2045 (an acrylic resin available from E. I. duPont de Nemours & Co., Wilmington, DE; used in this example primarily as a viscosity modifier, it can be used in forming operations as a binder), and 88.50 g. cyclohexane. The resluting slurry was quite pourable.

EXAMPLE 16

A slurry was made with the following components: 15.5 ml (62 g.) of A16SG alumina; 6.7 ml (24 g.) magnesium oxide (available from ICD Chemicals, Lyndhurst, NJ); 27.5 ml (73 g) silicon dioxide (available from Morton Thiokol, Danvers, MA); 7.5 ml (32 g) germanium oxide (available from Eagle Pitcher Ind., Quawpaw, OK), 3.8 g NARLEX LD-45, and 43 g. water. The resulting slurry had 55% by volume of solids and a pourable viscosity.

What is claimed is:

1. A pourable slurry composition for the fabrication of sintered articles, comprising:
   (i) narrow size range, colloidal sinterable particles selected from the group consisting of ceramics, metals, and mixtures thereof;
   (ii) a solvent system; and
   (iii) a dispersant polyethylene imine-based polyelectrolytes, the dispersant present in an amount effective to achieve a solids loading of at least 55% by volume and to provide a slurry viscosity of less than 7,500 cPs at 100 sec$^{-1}$.

2. The slurry defined by claim 1, wherein the viscosity is less than 2,000 cPs at 100 sec.$^{-1}$.

3. The slurry defined by claim 1, wherein the slurry has a pourability test time of less than 200 seconds.

4. The slurry defined by claim 3, wherein the slurry has a pourability test time of less than 75 seconds.

5. The slurry defined by claim 1, wherein the particles include those of a ceramic composition selected from the group consisting of alumina, aluminum nitride, silicon nitride, silicon carbide, silica, unstabilized zirconia, partially stabilized zirconia, stabilized zirconia, dissociated zircon, yttria, titania, barium titanate, diborides, beryllia, and mixtures thereof.

6. The slurry defined by claim 1, wherein the particles include those of a metallic composition selected from the group consisting of copper, iron, aluminum, gold, silver, nickel, and mixtures thereof.

7. The slurry defined by claim 1, wherein the solvent includes water, methanol, ethanol, isopropanol, n-butanol, cyclohexane, benzene, acetone, 2-butanone, dimethyl sulfoxide, toluene, acrylic acid-based monomers, vinylic monomers, or mixtures thereof.

8. A process for forming a slurry having a pourable viscosity for fabricating sintered articles, comprising:
   (i) admixing
      (a) a solvent system,
      (b) a dispersant polyethylene imine-based polyelectrolytes, and
      (c) at least 55% by volume of sinterable particles of narrow size range selected from the group consisting of ceramics, metals, and mixtures thereof, and consisting essentially of those having a submicron average particle size, those having a colloidal average particle size, or mixtures thereof, at least a portion of the particulates admixed in a staged order of addition; and
   (ii) agitating the mixture under high energy to provide a slurry having a viscosity of less than 7,500 cPs at 100 sec.$^{-1}$.

9. The process defined by claim 8, wherein the viscosity is less than 2,000 cPs at 100 sec$^{-1}$.

10. The process defined by claim 8, wherein the slurry has a pourability test time of less than 200 seconds.

11. The process defined by claim 10, wherein the slurry has a pourability test time of less than 75 seconds.

12. The process defined by claim 11, wherein the agitating occurs for not more than 48 hours.

13. The process defined by claim 8, further comprising the step of providing the sinterable particles by centrifugal classification.

* * * * *